(No Model.)
E. P. HOLDEN.
VEHICLE SPRING.
No. 422,784. Patented Mar. 4, 1890.
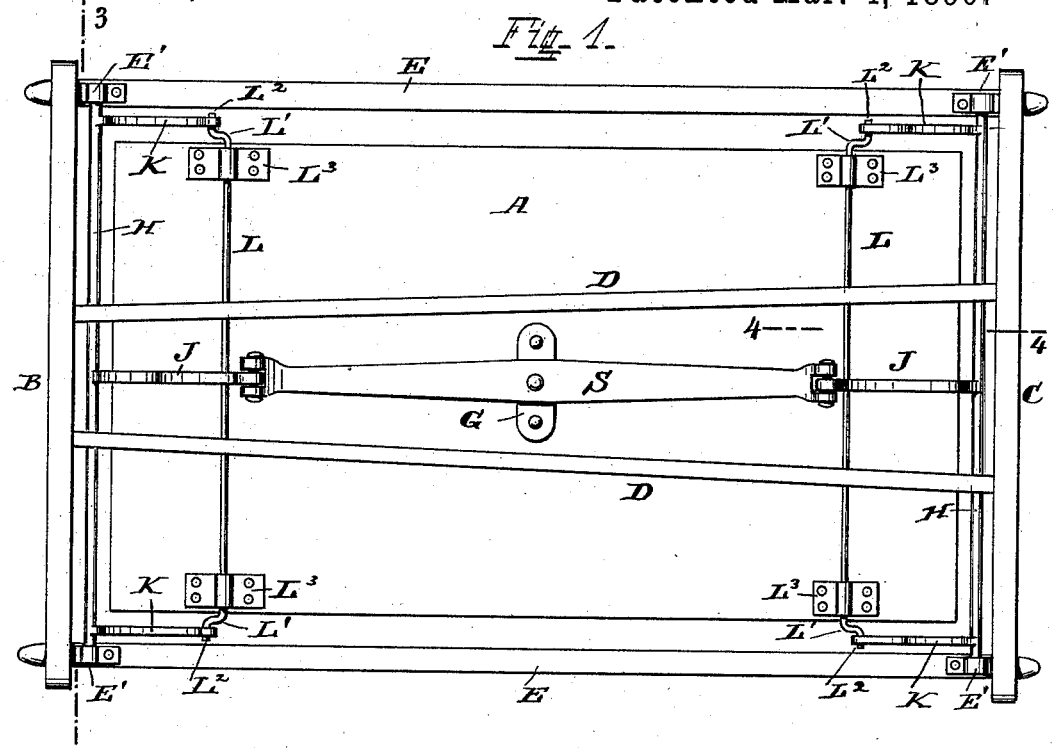
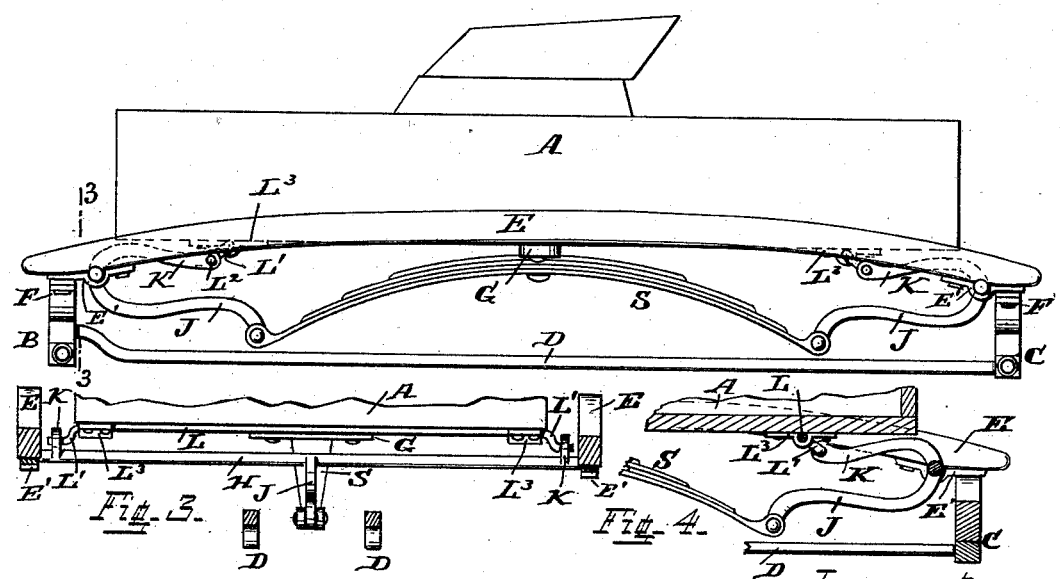
Attest
K. Smith
G. H. Paver
Inventor
Everett Plin Holden
by Wm. Hubbell Fisher, Atty.

UNITED STATES PATENT OFFICE.

EVERETT PLIN HOLDEN, OF PRICETOWN, OHIO.

VEHICLE-SPRING.

SPECIFICATION forming part of Letters Patent No. 422,784, dated March 4, 1890.

Application filed July 22, 1889. Serial No. 318,191. (No model.)

*To all whom it may concern:*

Be it known that I, EVERETT PLIN HOLDEN, a citizen of the United States, and a resident of Pricetown, in the county of Highland and State of Ohio, have invented certain new and useful Improvements in Self-Equalizers for Vehicles, of which the following is a specification.

The various features of my invention and the several advantages resulting from their use conjointly or otherwise will be apparent from the following description and claims.

In the accompanying drawings, making part of this specification, Figure 1 is a bottom view of the vehicle-body and gear provided with my invention. Fig. 2 is a side elevation of the same, right side uppermost; Fig. 3, a vertical cross-section of the same, taken at the dotted line 3 3 of Fig. 2 and looking from left to right. Fig. 4 represents a vertical longitudinal section of a part of the vehicle, the section being between the bearing $L^3$ and the longitudinal center of the vehicle and looking toward the outer side of the vehicle.

A indicates a vehicle-body of any desired form.

B indicates the front bolster, and C the rear axle. The perch D D, connecting the front bolster and rear axle, should be rigid, and may consist of one central perch or a forked one or two pieces D D, as seen in the illustration. In other words, the precise form of the perch is not an essential of my invention. Where the body-supporting springs are hung low, the perch is preferably of two parts, as shown. Such construction allows my central spring, hereinafter described, to more perfectly operate.

The gear is provided with two side bars, one of these side bars E being at one side and the other E at the other side of the vehicle. At the rear end of the vehicle is an end bar F, preferably rigid, as shown, and connected with the rear axle or equivalent portion of the vehicle. A similar end bar F is connected to the bolster or equivalent portion of the vehicle. The side bars at their forward ends are rigidly connected to the forward end bar, and at their rear ends rigidly connected to the rear end bar, and thus form a frame, which contributes to the strength of the vehicle and enables the best results to be obtained from my invention.

In the center of the gear is located a semi-elliptic spring S, whose convex side is uppermost, and whose length runs parallel to the length of the vehicle. This convex side is rigidly secured to the body, preferably by means of broad brace-plate G, secured to the under side of the body A. To the under side of this brace-plate the spring is riveted or bolted, as desired.

At the forward end of the vehicle is a cross-bar H, parallel to the front end of the body and near the side bar. The ends of this cross-bar H are journaled in their respective adjacent side bars E E at E'. From the center of this cross-rod H extends rearward an arm J, whose free end is pivoted to the forward end of the spring in any suitable manner. A convenient mode of such pivotal connection is shown, and consists as follows: The end of the spring is provided with two eyes, a space being present between them. Into this space is inserted the free end of the arm J. A bolt is passed through the one eye of the spring through a hole in the side end of the arm J, and then through the other eye of the spring and secures them pivotally together. This cross-rod H also carries two other arms K K, extending rearward and preferably located outside of the body and inside or between the side bars E E. One of these arms K is near one of the side bars E and the other arm K is located near the other side bar E.

Underneath the forward portion of the body and parallel to the cross-rod H is the cross-rod L, whose ends respectively project beyond the adjacent sides of the body A. Each end of cross-rod L is provided with its crank or arm L', pivoted to the free end of the adjacent arm K. The preferred mode of such connection consists, as shown, in providing the arm L' with a wrist $L^2$, which latter enters an opening in the end of the arm K. This cross-rod L is journaled to the bottom of the body in bearing $L^3$. At the other or rear end of the vehicle is a cross-rod H. This cross-rod H is a duplicate of the cross-rod H at the forward end of the vehicle. It is provided with a central arm J and end arms K of a form substantially similar to the arm J and the end arms K of the forward cross-rod H. This rear cross-rod H is journaled on the side bars E similarly to the mode in which the forward cross-rod H is journaled on the side bar E, the difference being that while the arms J and K of the forward cross-rod H extend rearward those of the rear cross-rod H extend forward. The arm J of this rear cross-rod H is pivotally connected to the rear end of the spring S in a manner similar to that in which the arm J of the forward cross-rod H is connected to the forward end of the said spring.

At the rear end of the vehicle is a cross-rod L, journaled to the vehicle-body forward of the rear cross-rod H and carrying cranks or arms L', respectively united to the respective adjacent free ends of the arms K of the rear cross-rod in a manner substantially similar to that in which the arm L' of the front cross-rod L is united to the arms K of the front cross-rod H, the arms L' of the rear cross-rod L extending rearward toward the rear cross-rod H.

My invention operates as follows: Any load placed in or on the body of the vehicle tends to depress the body. The depression of the body exerts a downward pressure upon the spring. The spring in turn at each end presses downward the free ends of the arms J J, and the latter, through the cross-rods H H, in turn depress the free ends of the arms K K, and these in turn have a tendency to depress the free ends of the arms L' of the cross-rods L L. The resistance to depression is thus gradually and evenly communicated to the various levers, and the body descends gradually and without sudden stop or sudden descent. In point of fact, the free ends of the arms L' L' of the cross-rods are not depressed by the arms K K. As the spring S gradually yields, the body descends and the free ends of the arms L' L' of the cross-rods L L rise, as owing to the flexion of the spring the vehicle-body descends faster than the free ends of the arms K K do.

It will be observed that my invention provides a suitable resistance to meet the lateral and end thrust of the vehicle-body, and this prevents such thrust causing the body to sway back and forth or sidewise. At the same time the single spring, through the combination of itself and the levers already mentioned and the body, furnishes ample elasticity, and the vehicle rises and falls gradually and evenly. All parts of the body fall or rise together substantially to the same degree. Thus a thrust communicated to the body at one side, end, or corner is evenly distributed throughout the entire vehicle-body, and no one part of the bottom of the vehicle-bottom is nearer to or farther away from the plane of the axles than is another part. In other words, the bottom of the body remains at all times and under all circumstances parallel to the plane of the axles.

What I claim as new and of my invention, and desire to secure by Letters Patent, is—

1. The combination of the spring S, whose central portion is secured to the vehicle-body, and the cross-rods H, journaled at E' and carrying arms K and arms J, and the cross-rods L, having arms L' and journaled to the body, the arms K being respectively pivoted to the ends of the spring S, and the arms K being pivoted to the arms L', substantially as and for the purposes specified.

2. The combination of the spring S, whose central portion is secured to the vehicle at or near the central portion of the bottom of the body, and whose length is parallel to the longitudinal axis of the vehicle, and end cross-rods H, journaled at E' and provided with arms J and arms K, and end cross-rod L, journaled at $L^3$ to the body and provided with arms L', each of the arms J being pivoted at its free end to the spring, and each of the arms K having its free end pivoted to the free end of its adjacent arm L', substantially as and for the purposes specified.

3. The combination of the spring S, secured to the vehicle-body, frame consisting of end bars F F and side bars E E and end cross-rods H, having arms J and K, and end cross-rods L, having arms L', the arms J being respectively pivoted and connected to the adjacent respective ends of the spring, and the arms L' being pivoted at their free ends to their respective adjacent ends of the arms K, the cross-rod L being journaled on the same body, and the cross-rod H being journaled on the frame, substantially as and for the purposes specified.

4. The combination of the spring S, secured to the vehicle-body, rigid frame consisting of the end bars F F, rigidly connected to the side bars E E, and end cross-rods H, having arms J and K, and end cross-rods L, having arms L', the arms J being respectively pivoted and connected to the adjacent respective ends of the spring, and the arms L' being pivoted at their free ends to their respective adjacent ends of the arms K, the cross-rod L being journaled on the body, and the said cross-rod H being journaled on the frame, substantially as and for the purposes specified.

EVERETT PLIN HOLDEN.

Attest:
A. M. CUSTER,
W. S. BASKER.